United States Patent
Chen et al.

(10) Patent No.: US 9,765,444 B2
(45) Date of Patent: Sep. 19, 2017

(54) CONTINUOUS ELECTROCHEMICAL MACHINING APPARATUS

(71) Applicant: METAL INDUSTRIES RESEARCH & DEVELOPMENT CENTRE, Kaohsiung (TW)

(72) Inventors: You-Lun Chen, Taichung (TW); Hong-Yi Chen, Taichung (TW); Da-Yu Lin, Taichung (TW); Ho-Chung Fu, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 385 days.

(21) Appl. No.: 14/558,877

(22) Filed: Dec. 3, 2014

(65) Prior Publication Data

US 2016/0160377 A1 Jun. 9, 2016

(51) Int. Cl.
*C25F 3/14* (2006.01)
*C25F 7/00* (2006.01)
*B23H 3/04* (2006.01)

(52) U.S. Cl.
CPC .............. *C25F 3/14* (2013.01); *B23H 3/04* (2013.01); *C25F 7/00* (2013.01)

(58) Field of Classification Search
CPC ............... C25F 7/00; C25F 3/14; B23H 3/04
USPC .......................................... 204/212; 205/686
See application file for complete search history.

(56) References Cited

U.S. PATENT DOCUMENTS

| 4,762,599 A | * | 8/1988 | Damiron | C25D 7/0614 |
| | | | | 204/206 |
| 2009/0127131 A1 | * | 5/2009 | McFarland | B23H 9/04 |
| | | | | 205/641 |

FOREIGN PATENT DOCUMENTS

| CN | 1993604 A | 7/2007 | |
| WO | WO 9403655 A1 * | 2/1994 | ............... C25D 5/08 |

* cited by examiner

*Primary Examiner* — Nicholas A Smith
(74) *Attorney, Agent, or Firm* — Rosenberg, Klein & Lee (57) ABSTRACT

The invention discloses a continuous electrochemical machining apparatus, which comprises an electrode wheel and an auxiliary module. The auxiliary module pushes the material tape to the insulating part of the electrode wheel. The electrode wheel drives the material tape to move. Electrochemical machining is performed on the material tape using at least a conductive pattern of the electrode wheel for forming a plurality of patterns on the material tape. Thereby, continuous electrochemical machining can be performed on the material tape.

15 Claims, 10 Drawing Sheets

CONTINUOUS ELECTROCHEMICAL MACHINING APPARATUS

FIELD OF THE INVENTION

The invention relates generally to a processing apparatus, and particularly to a continuous electrochemical machining apparatus.

BACKGROUND OF THE INVENTION

The electrochemical machining method processes a workpiece by dissolving metal electrochemically at the anode in an electrolyte and is applicable to processing extremely hard materials or materials difficult to be machined by using traditional processing methods. While performing an electrochemical machining, the workpiece is connected to the positive electrode of a power supply and the machining electrode is connected to the negative electrode of the power supply. In addition, a gap is maintained between the workpiece and the machining electrode. The electrolyte flows through the gap between the workpiece and the machining electrode for forming a conduction circuit between the workpiece and the machining electrode. The workpiece is dissolved electrochemically at the anode for machining the workpiece and removing the undesired parts. In an electrochemical machining, the machining electrode does not contact the workpiece. Thereby, no cutting stress is generated. Besides, the hardness of the workpiece is not a concern.

When a general electrochemical machining apparatus is used for performing an electrochemical machining, the workpiece is placed below the machining electrode. A lifting device is used for moving the machining electrode and maintaining the gap between the workpiece and the machining electrode. Then a voltage is applied and the electrolyte is provided for performing the electrochemical machining on the workpiece using the machining electrode. After the electrochemical machining on the workpiece is finished, the lifting device is used for lifting the machining electrode and providing space for replacing a new workpiece. Hence, the electrochemical machining can be performed on the new workpiece. In a general electrochemical machining, it still takes much time for supplying material for the workpiece. Accordingly, the continuous electrochemical machining still needs to be improved.

SUMMARY

The invention discloses a continuous electrochemical machining apparatus, which performs electrochemical process on a material tape for forming a plurality of patterns on the material tape. The continuous electrochemical machining apparatus comprises an electrode wheel and an auxiliary module. The electrode wheel includes at least a conductive pattern and an insulating part on the periphery. The conductive pattern is exposed to the insulating part. The auxiliary module presses the material tape against the insulating part of the electrode wheel.

DETAILED DESCRIPTION

In order to make the structure and characteristics as well as the effectiveness of the invention to be further understood and recognized, the detailed description of the invention is provided as follows along with embodiments and accompanying figures.

Figure 1:
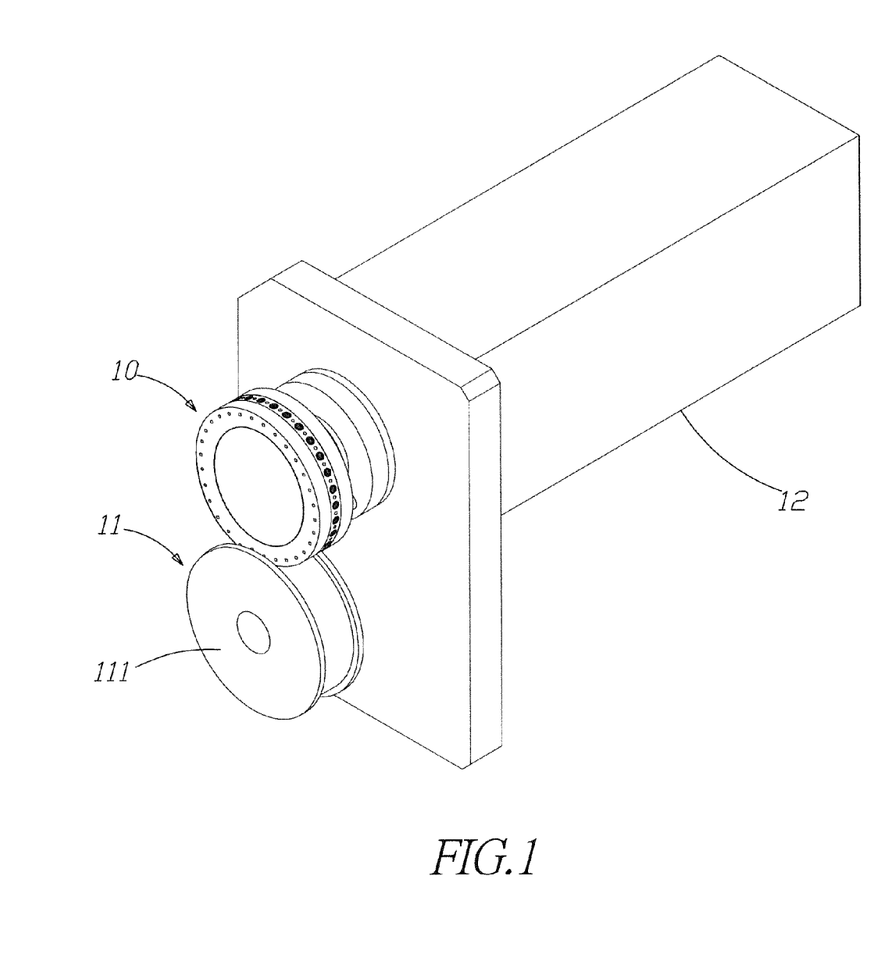
FIG. 1 shows a schematic diagram of the continuous electrochemical machining apparatus according the first embodiment of the invention.
Figure 2:
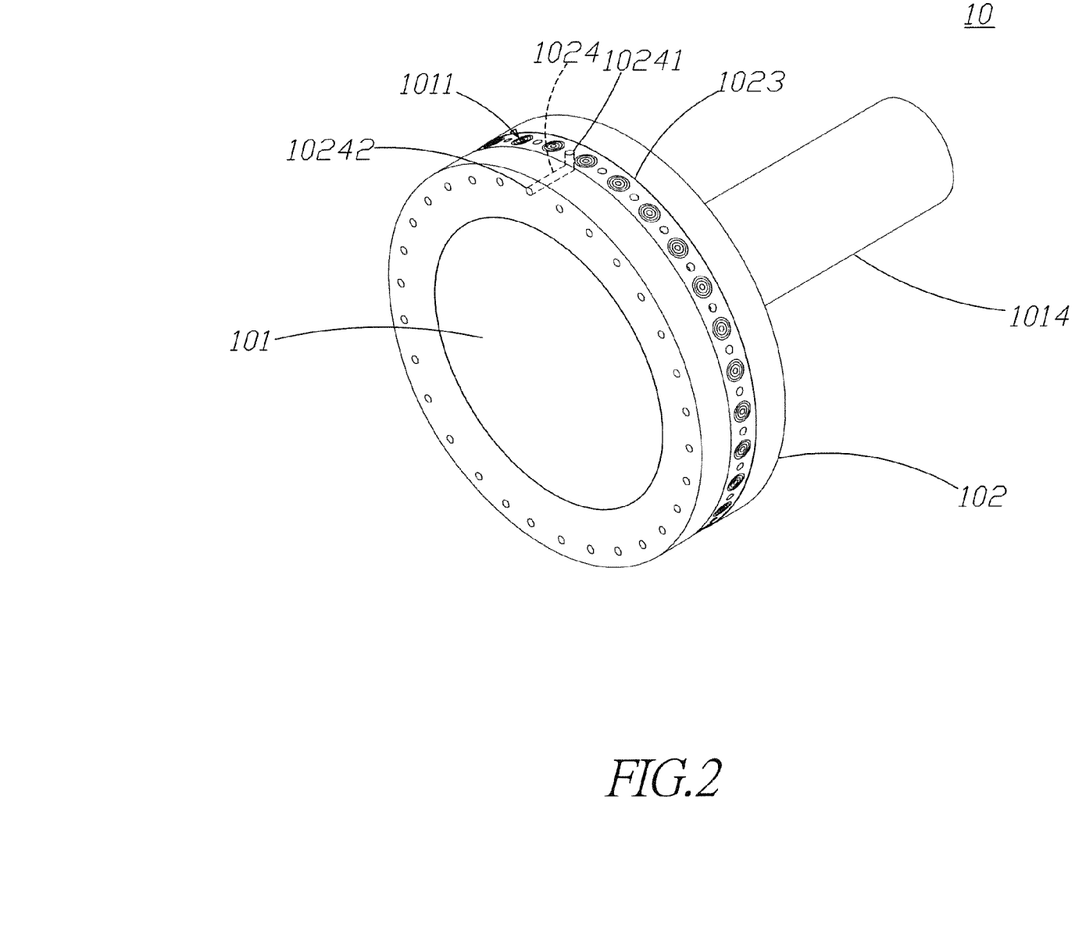
FIG. 2 shows a schematic diagram of the electrode wheel of the continuous electrochemical machining apparatus according the first embodiment of the invention.
Figure 3:
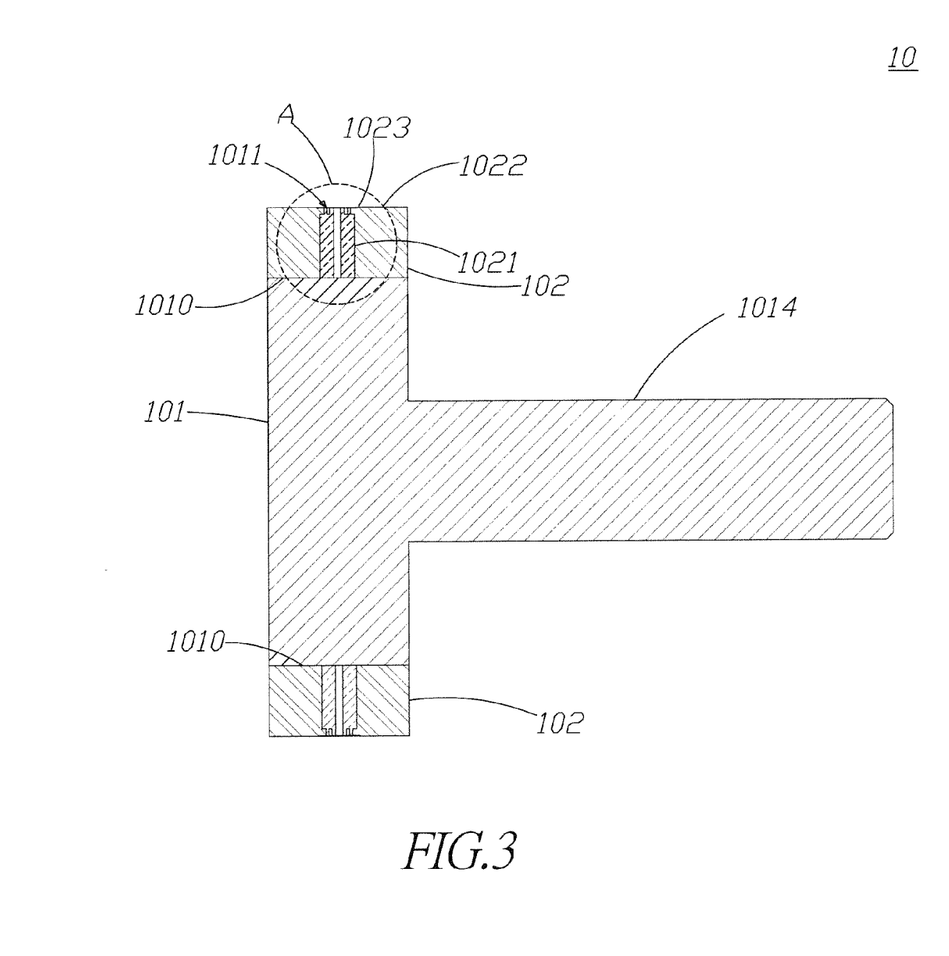
FIG. 3 shows a cross-sectional view of the electrode wheel of the continuous electrochemical machining apparatus according the first embodiment of the invention.

Please refer to FIGS. 1, 2, and 3, which show schematic diagrams of the continuous electrochemical machining apparatus and the electrode wheel and a cross-sectional view of the electrode wheel according the first embodiment of the invention. As shown in the figures, the continuous electrochemical machining apparatus 1 according to the invention comprises an electrode wheel 10 and an auxiliary module 11. The electrode wheel 10 comprises an electrode body 101 and an insulating part 102. The electrode body 101 can be a cylindrical conductor. The peripheral surface 1010 thereof includes at least a conductive pattern 1011. The plurality of conductive patterns 1011 are spaced on the peripheral surface 1010 of the electrode body 101. The shape and interval of the plurality of conductive patterns 1011 are determined by a plurality of patterns to be formed on the material tape. As shown in FIG. 2 according to the embodiment, the conductive pattern 1011 includes concentric circles. Nonetheless, this is only an embodiment of the invention. The conductive pattern 1011 according to the invention is not limited to concentric circles.

Figure 4:
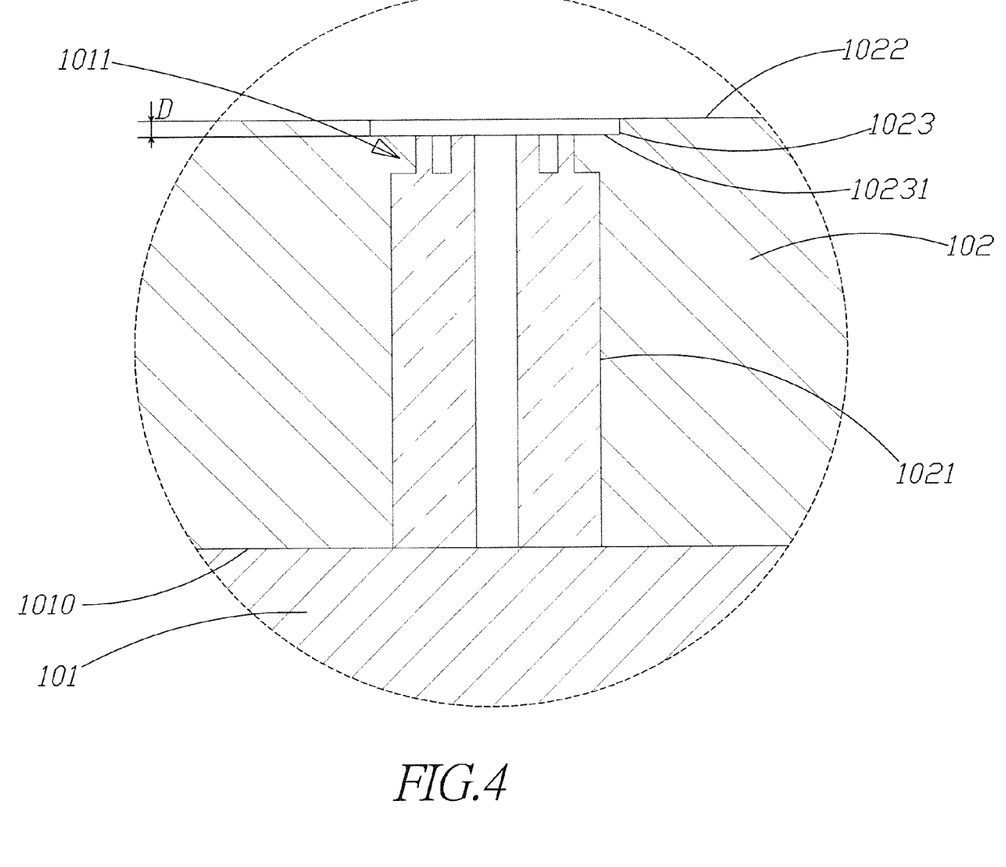
FIG. 4 shows an enlarged view of the region A in FIG. 3.

Please refer to FIG. 4, which shows an enlarged view of the region A in FIG. 3. According to an embodiment of the invention, the insulating part 102 is formed on the peripheral surface 1010 of the electrode body 101 having the conductive patterns 1011 by injection molding. There are many methods to form the insulating part 102. The above method is only an embodiment of the invention. According to the embodiment, because the electrode body 101 is cylindrical, the insulating part 102 is formed on the electrode body 101 and becoming an insulating ring. The insulating part 102 does not cover the end part of the conductive patterns 1011, which means that the insulating part 102 is formed on the periphery of the conductive patterns 1011 for exposing the conductive patterns 1011 from the insulating part 102. Thereby, the insulating part 102 formed on the electrode body 101 includes a plurality of hollow parts 1021 corresponding to the plurality of conductive patterns 1011. Thereby, the plurality of conductive patterns 1011 are exposed from the insulating part 102. In addition, there must be a machining gap D between the surface of the plurality of conductive patterns 1011 and the peripheral surface 1022 of the insulating part 102. Thereby, the plurality of conductive patterns 1011 can perform an electrochemical machining on the material tape.

According to the embodiment, a recess 1023 can be formed on the periphery of the insulating part 102 and the plurality of hollow parts 1021 can be formed in the insulating part 102. In other words, the plurality of hollow parts 1021 are located at the bottom part 10231 of the recess 1023 and communicating with the recess 1023. Thereby, the machining gap D can be formed between the peripheral surface 1022 of the insulating part 102 and the bottom part 10231 of the recess 1023. Consequently, the machining gap D is located between the surface of the plurality of conductive patterns and the peripheral surface 1022 of the insulating part 102.

Please refer to FIG. 1 again. The auxiliary module 11 according to the embodiment includes an auxiliary wheel 111. Please refer to FIG. 5 and FIG. 6 concurrently. The figures show an operational diagram of the continuous electrochemical machining apparatus according the first embodiment of the invention and an enlarged view of the region B in FIG. 5. As shown in the figures, the material tape 2 is disposed on the peripheral surface 1111 of the auxiliary wheel 111, which presses the material tape 2 against the insulating part 102 of the electrode wheel 10. The insulating part 102 includes the recess 1023, which prevents the material tape 2 from contacting the conductive pattern 1011 directly. In addition, a blocking plate 112 is disposed on each of the both sides of the peripheral surface 1111 of the auxiliary wheel 111. When the auxiliary wheel 111 carries the material tape 2 and presses the material tape 2 against the insulating part 102 of the electrode wheel 10, the two blocking plates 112 can avoid the material tape 2 from coming off the auxiliary wheel 111 in the electrochemical machining.

When the continuous electrochemical machining apparatus 1 described above performs an electrochemical machining on the material tape 2, the electrode wheel 10 further includes an shaft 1014, which is connected with a driving module 12. The driving module 12 includes a motor 121 and a reducing mechanism 122. The reducing mechanism 122 is connected to the shaft 1014 and the motor 121 of the electrode wheel 10. Thereby, the reducing mechanism 122 reduces the rotate speed of the motor 121 and drives the shaft 1014 of the electrode wheel 10 to rotate. In turn, the electrode wheel 10 is driven to rotate. Nonetheless, this is only an embodiment of the driving module 12 according to the invention; the invention is not limited to this embodiment. The electrode wheel 10 according to the embodiment can be an active wheel. As the driving module 12 drives the electrode wheel 10 to rotate, the electrode wheel 10 drives the material tape 2 to move. Meanwhile, the auxiliary wheel 111 rotates for guiding the material tape 2 to move forward. The electrode wheel 10, the auxiliary module 11, and the driving module 12 further include a carrying base 13. The carrying base 13 according to the embodiment comprises a base plate 131. The electrode wheel 10 and the auxiliary module 11 are disposed on one side of the base plate 131. The driving module 12 is located on the other side of the base plate 131 and connected with the electrode wheel 10. Hence, the carrying base 13 carries and fixes the electrode wheel 10, the auxiliary module 11, and the driving module 12.

Figure 5:
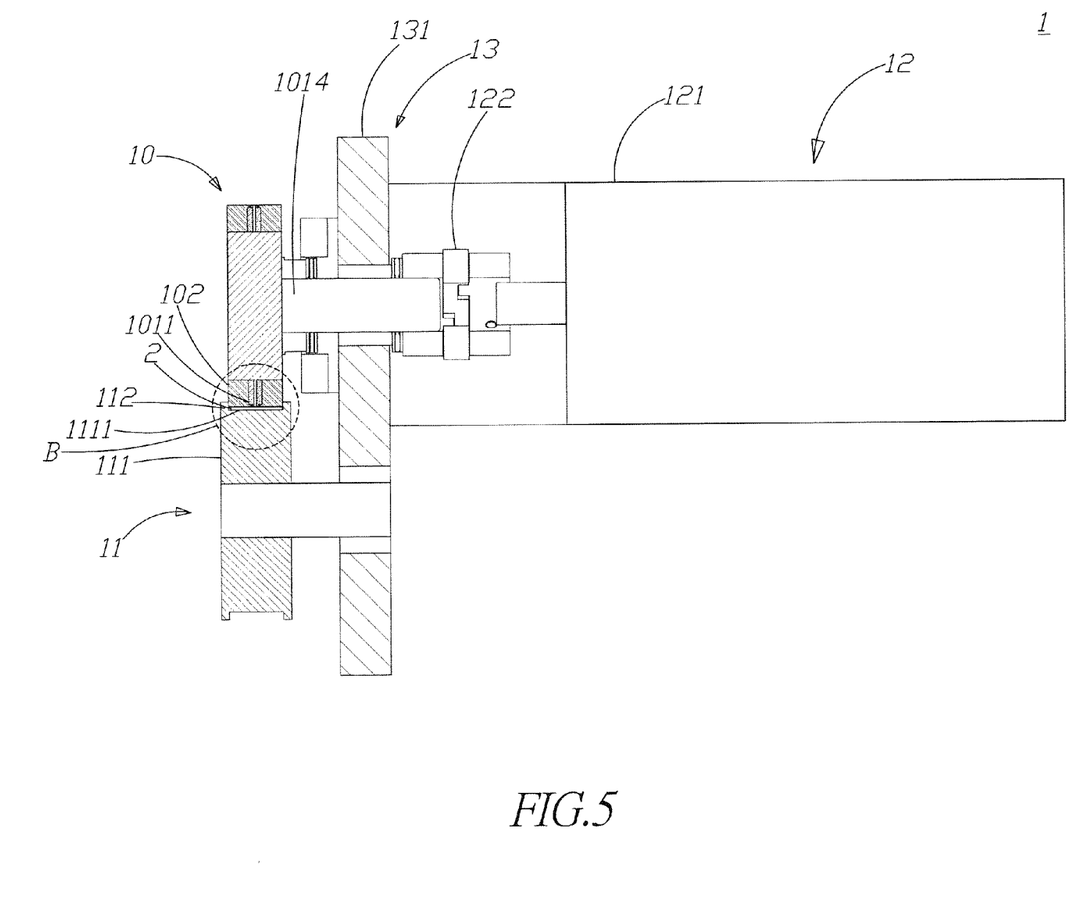
FIG. 5 shows an operational diagram of the continuous electrochemical machining apparatus according the first embodiment of the invention.
Figure 7:
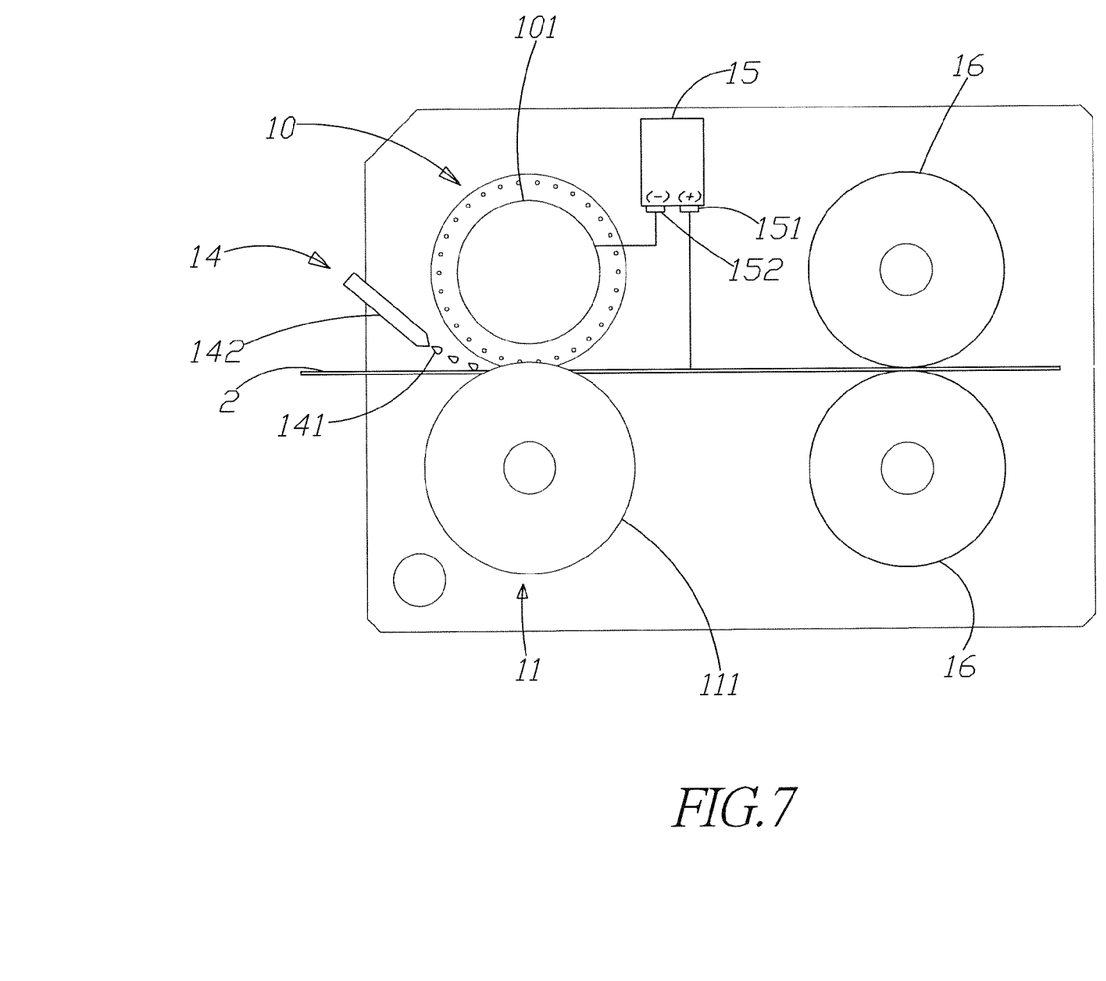
FIG. 7 shows another operational diagram of the continuous electrochemical machining apparatus according the first embodiment of the invention.

Please refer to FIG. 7, which shows another operational diagram of the continuous electrochemical machining apparatus according the first embodiment of the invention. As shown in the figure, as the electrode wheel 10 drives the material tape 2 to move, an electrolyte supply module 14 is used for supplying an electrolyte 141 between the electrode wheel 10 and the material tape 2. The electrolyte 141 will flow into the recess 1023 of the insulating part 102, so that the conductive patterns 1011 of the electrode wheel 10 and the material tape 2 both contact the electrolyte 141. The two blocking plates 112 of the auxiliary wheel 111 can block the electrolyte 141 from leaking between the material tape 2 and the peripheral surface 1022 of the insulating part 102, as shown in FIG. 5, achieving the function of collecting the electrolyte 141 into the recess 1023 of the insulating part 102. The electrolyte supply module 14 according to the embodiment includes an electrolyte nozzle 142. It is only an embodiment of the invention; the invention is not limited to the embodiment.

Please refer to FIGS. 3 to 5. According to another embodiment of the invention, another method for supplying the electrolyte 141 is provided. Alternatively, the electrolyte supply module 14 can be connected to an electrolyte channel 103 of the electrode wheel 10. The electrolyte channel 103 penetrates a side surface 1012 and the peripheral surface 1010 of the electrode body 101. It also penetrates the plurality of conductive patterns 1013 and communicates with the recess 1023. A first opening 1031 is located on the side surface 1012 of the electrode body 101. The side surface 1012 of the electrode body 101 is the central part of a sidewall of the electrode wheel 10. According to the embodiment, the first opening 1031 is located at the center of the electrode body 101. A plurality of second openings 1032 are located at the bottom parts 10231 of the recesses 1023 of the insulating parts 102 and within the regions of the plurality of conductive patterns 1013, respectively. Thereby, the electrolyte supply module 14 supplies the electrolyte 141 to the first opening 1031 of the electrolyte channel 103. The electrolyte 141 flows to the plurality of second openings 1032 through the electrolyte channel 103 for supplying the electrolyte 141 to the recesses 1023 of the electrode wheel 10 and enabling the electrolyte 141 to contact the plurality of conductive patterns 1013 and the material tape 2. If the first method for supplying the electrolyte 141 is adopted, the electrolyte channel 103 of the electrode wheel 10 can be omitted.

Moreover, the positive electrode 151 of a power supply module 15 is connected to the material tape 2; the negative electrode 152 thereof is connected to the electrode body 101 of the electrode wheel 10. Thereby, the plurality of conductive patterns 1011 of the electrode wheel 10 can perform an electrochemical machining on the material tape 2 for forming a plurality of patterns corresponding to the plurality of conductive patterns 1011 on the material tape 2. When the electrode wheel 10 continues to drive the material tape 2 to move forward, the plurality of conductive patterns 1011 of the electrode wheel 10 can perform electrochemical machining on the material tape 2 continuously for electrochemically machining the material tape 2 continuously. The mechanism of the continuous electrochemical machining apparatus 1 according to the present embodiment is simple, enabling stable electrochemical machining on the material tape 2.

Please refer again to FIG. 7. The continuous electrochemical machining apparatus 1 according to the embodiment further comprises two conveying wheels 16 located on both sides of the material tape 2. The material tape 2 is situated between the two conveying wheels 16. When the material tape 2 moves between the two conveying wheels 16, the two conveying wheels 16 are driven to rotate. Then the two conveying wheels 16 facilitate smooth forward movement of the material tape 2.

Figure 6:
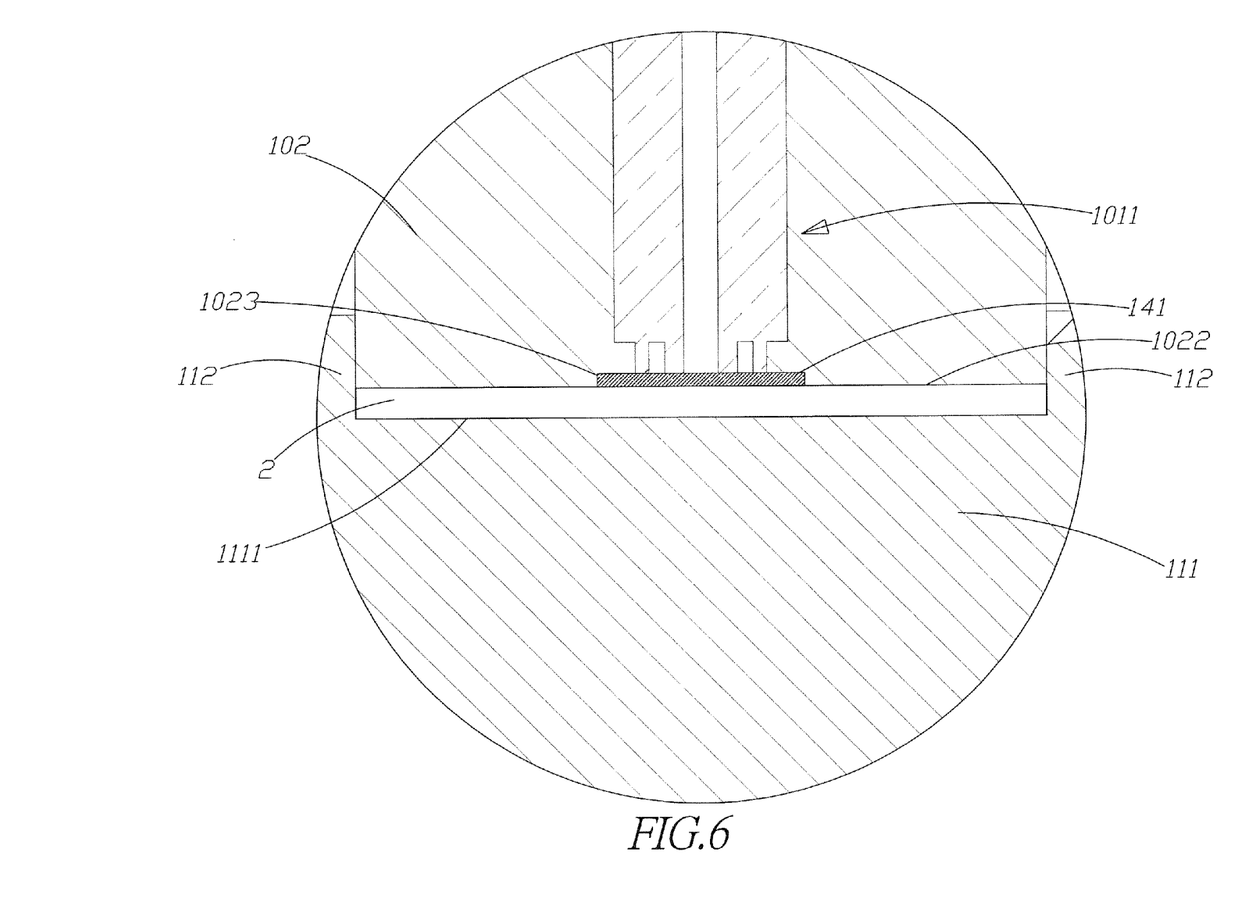
FIG. 6 shows an enlarged view of the region B in FIG. 5.

Please refer to FIG. 2. The insulating part 102 according to the embodiment further includes a plurality of electrolyte flowing holes 1024. A first opening 10241 on one end of each electrolyte flowing hole 1024 is located at the bottom part 10231 of the recess 1023 and between two hollow parts 1021. A second opening 10242 on the other end of each electrolyte flowing hole 1024 is located on the side of the insulating part 102. The first opening 10241 communicates with the second opening 10242. When the continuous electrochemical machining apparatus 1 performs an electrochemical machining, as shown in FIG. 6, the electrolyte 141 is filled in the recesses 1023 of the insulating part 102. The electrolyte supply module 14 supplies the electrolyte 141 continuously between the electrolyte 10 and the material tape 2. The electrolyte 141 in the recesses 1023 flows from the plurality of first openings 10241 of the plurality of electrolyte flowing holes 1024 to the plurality of second openings 10242 of the plurality of electrolyte flowing holes 1024. Thereby, the electrolyte 141 in the recesses 1023 can flow out via the plurality of electrolyte flowing holes 1024 for increasing fluidity of the electrolyte 141 in the recesses 1023. Meanwhile, the products of electrolysis inside the recesses 1023 can be exhausted via the plurality of electrolyte flowing holes 1024. Thereby, the machining efficiency of the electrochemical machining can be enhanced.

Figure 8:
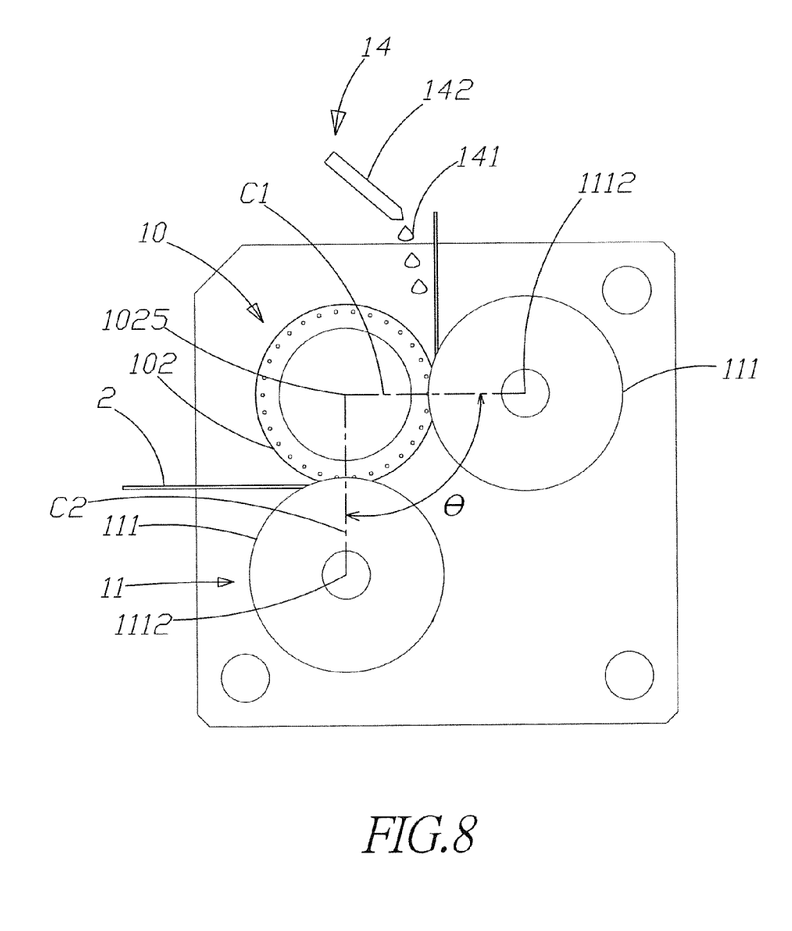
FIG. 8 shows an operational diagram of the continuous electrochemical machining apparatus according the second embodiment of the invention.

Please refer to FIG. 8, which shows an operational diagram of the continuous electrochemical machining apparatus according the second embodiment of the invention. As shown in the figure, the auxiliary module 11 according to the embodiment includes two auxiliary wheels 111 both pressing the material tape 2 against the insulating part 102 of the electrode wheel 10. The shafts 1112 of the two auxiliary wheels 111 are adjusted, respectively, so that the angle θ between the two lines C1, C2 connecting the shafts 1112 and the shaft 1025 of the electrode wheel 10, respectively, is between 60 and 120 degrees. Thereby, when the electrolyte 141 is supplied between the electrode wheel 10 and the material tape 2, the electrolyte 141 flows from the top of the electrode wheel 10 to the bottom and fills the recesses 1023 of the electrode wheel 10. The electrolyte 141 contacts the plurality of conductive patterns 1011 of the electrode wheel 10 and the material tape 2, so that the plurality of conductive patterns 1011 of the electrode wheel 10 can perform electrochemical machining on the material tape 2.

Figure 9:
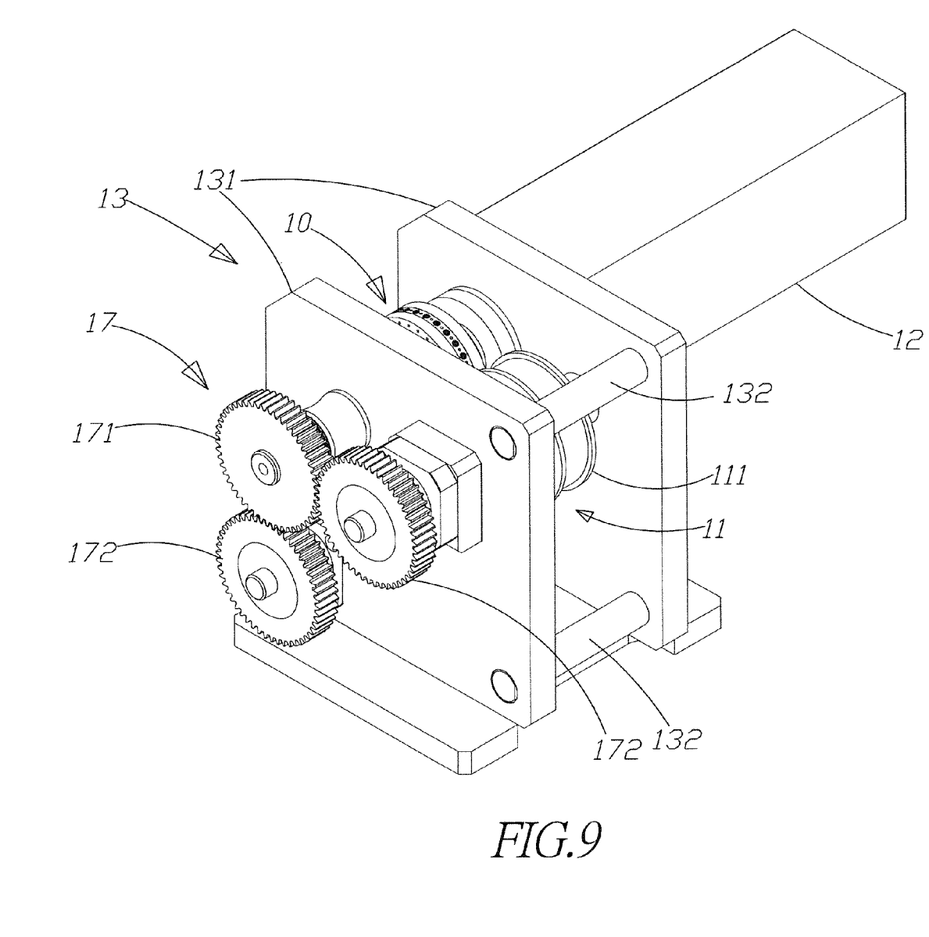
FIG. 9 shows a schematic diagram of the continuous electrochemical machining apparatus according the second embodiment of the invention.
Figure 10:
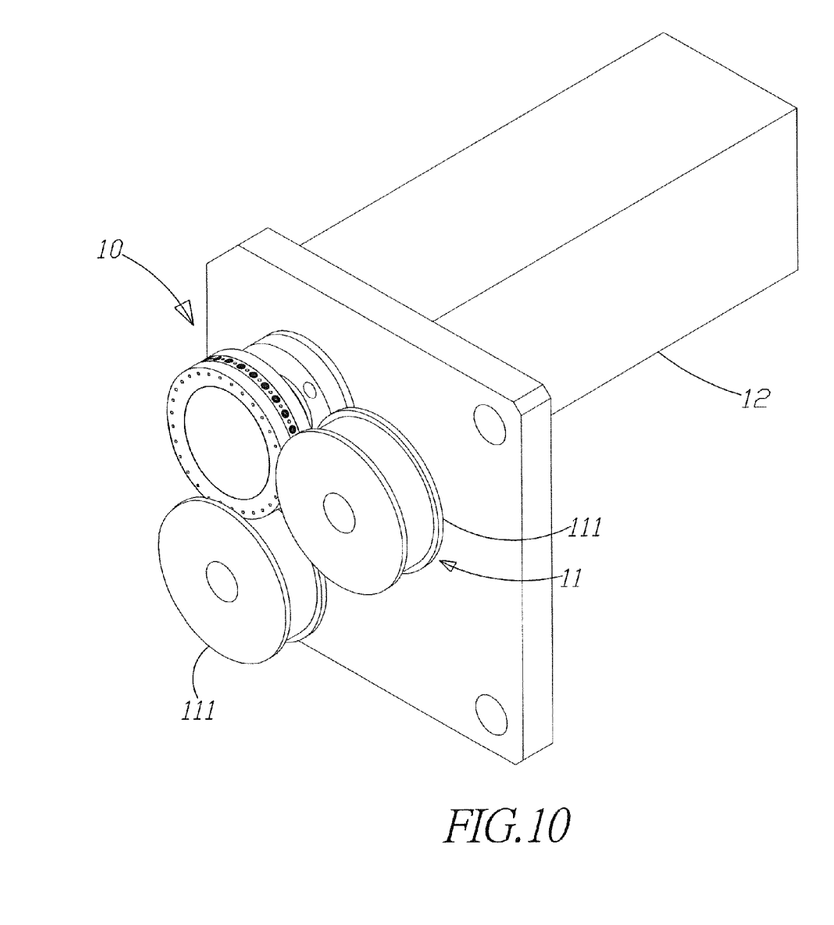
FIG. 10 shows a schematic diagram of the electrode wheel and the auxiliary module of the continuous electrochemical machining apparatus according the second embodiment of the invention.

Please refer to FIG. 9 and FIG. 10, which show a schematic diagram of the continuous electrochemical machining apparatus and a schematic diagram of the electrode wheel and the auxiliary module according the second embodiment of the present invention. As shown in the figures, the continuous electrochemical machining apparatus 1 according to the embodiment further comprises a transmission module 17 assembled to the electrode wheel 10 and the auxiliary module 11. As the electrode wheel 10 drives the transmission module 17 to operate, the transmission module 17 drives the auxiliary module 11 to rotate for guiding the material tape 2 to move between the electrode wheel 10 and the auxiliary module 11. In other words, the transmission module 17 is used for ensuring that the auxiliary module 11 can rotate as the electrode wheel 10 rotates and thus improving the moving fluency of the material tape 2. In the following, the structure of the transmission module 17 according to the embodiment will be described in detail. The transmission module 17 according to the embodiment comprises a first gear 171 and two second gears 172. The first gear 171 is connected to the electrode wheel 10; the two second gears 172 are connected to the two auxiliary wheels 111, respectively. In addition, the two second gears 172 gear the first gear 171. When the driving module 12 drives the electrode wheel 10 to rotate, the electrode wheel 10 will drive the first gear 171 to rotate; the first gear 171 drives the two second gears 172 to rotate; and the two second gears 172 drive the two auxiliary wheels 111 to rotate. Consequently, the material tape 2 can be guided smoothly between the electrode wheel 10 and the two auxiliary wheels 111.

The electrolyte supplying method according to the embodiment includes that the electrolyte supply module 14 supplies directly the electrolyte 141 between the electrode wheel 10 and the material tape 2. Alternatively, the electrolyte supply module 14 can supply the electrolyte 141 to the electrolyte channel 103 of the electrode wheel 10, in which the electrolyte 141 flows between the electrode wheel 10 and the material tape 2 via the electrolyte channel 103. When the second electrolyte supplying method according to the embodiment is adopted, a flowing channel communicating with the electrolyte channel 103 of the electrode wheel 10 is disposed in the shaft 1711 of the first gear 171 of the transmission module 17 for supplying the electrolyte 141 to the electrolyte channel 103 of the electrode wheel 10.

According to the above embodiment, the electrode wheel 10 is the active wheel. Alternatively, one of the two auxiliary wheels 111 can be selected as the active wheel. The diving module 12 connects to and drives one of the two auxiliary wheel 111 for driving the transmission module 17 to rotate. The transmission module 17, in turn, drives the electrode wheel 10 connected with the transmission module 17 to rotate, driving the material tape 2 to move forward.

Furthermore, the carrying base 13 according to the embodiment comprises two base plates 131 and two positioning pillars 132. The two positioning pillars 132 are connected to the two base plates 131. The electrode wheel 10 and the auxiliary module 11 according to the embodiment are assembled between the two base plates 131. The driving module 12 is located on the outer side of one of the two base plates 131 and connected with the electrode wheel 10. The transmission module 17 is located on the outer side of the other base plate 131 and connected with the electrode wheel 10 and the two auxiliary wheels 111 of the auxiliary module 11. Thereby, the carrying base 13 according to the embodiment can carry and fix the electrode wheel 10, the auxiliary module 11, the driving module 12, and the transmission module 17 and thus enabling them to operate normally.

To sum up, the invention discloses a continuous electrochemical machining apparatus, which can perform electrochemical machining on the material tape continuously and thus forming patterns on the material tape continuously.

Accordingly, the invention conforms to the legal requirements owing to its novelty, nonobviousness, and utility. However, the foregoing description is only embodiments of the invention, not used to limit the scope and range of the invention. Those equivalent changes or modifications made according to the shape, structure, feature, or spirit described in the claims of the invention are included in the appended claims of the invention.

The invention claimed is:

1. A continuous electrochemical machining apparatus, performing an electrochemical machining on a material tape for forming a plurality of patterns on said material tape, comprising:

an electrode wheel, having at least a conductive pattern and an insulating part on the periphery, and said conductive pattern exposed to said insulating part; and an auxiliary module, pressing said material tape against said insulating part of said electrode wheel;

wherein the peripheral surface of said insulating part includes a recess.

2. The continuous electrochemical machining apparatus of claim 1, wherein said electrode wheel comprises:

an electrode body, having said conductive pattern on the peripheral surface;

wherein said insulating part is an insulating ring, disposed on the peripheral surface of said electrode body.

3. The continuous electrochemical machining apparatus of claim 1, wherein the bottom part of said recess includes at least a hollow part; said conductive pattern is located in said hollow part and exposed to said insulating part; and a machining gap is located between the peripheral surface of said insulating part and the bottom part of said recess.

4. The continuous electrochemical machining apparatus of claim 1, wherein said insulating part includes a plurality of electrolyte flowing holes; each of said plurality of electrolyte flowing holes includes a first opening and a second opening; said first opening is located on the bottom part of said recess; and said second opening is located on the side of said insulating part.

5. The continuous electrochemical machining apparatus of claim 1, and further comprising:

an electrolyte supply module, supplying an electrolyte between said electrode wheel and said material tape;

a driving module, connected to said electrode wheel, driving said electrode wheel to rotate, and said electrode wheel rotating for driving said material tape to move; and a carrying base, carrying said electrode wheel, said auxiliary module, and said driving module.

6. The continuous electrochemical machining apparatus of claim 5, and further comprising a transmission module, connected to said electrode wheel and said auxiliary module, said electrode wheel rotating for driving said transmission module, and said transmission module driving said auxiliary module to rotate.

7. The continuous electrochemical machining apparatus of claim 6, wherein said transmission module comprises a plurality of gears assembled to said electrode wheel and said auxiliary module.

8. The continuous electrochemical machining apparatus of claim 6, wherein said carrying base comprises two base plates; said electrode wheel and said auxiliary module are disposed between said two base plates; and said driving module and said transmission module are located on the outer sides of said two base plates.

9. The continuous electrochemical machining apparatus of claim 1, wherein said insulating part includes a plurality of electrolyte flowing holes.

10. The continuous electrochemical machining apparatus of claim 1, and further comprising two conveying wheels located on both sides of said material tape and pressing against said material tape between said two conveying wheels.

11. The continuous electrochemical machining apparatus of claim 1, wherein said auxiliary module comprises two auxiliary wheels pressing said material tape against said insulating part of said electrode wheel; and an angle is formed between the two lines connecting the shafts of said auxiliary wheels and the shaft of said electrode wheel, respectively.

12. The continuous electrochemical machining apparatus of claim 11, wherein said angle is between 60 and 120 degrees.

13. The continuous electrochemical machining apparatus of claim 1, wherein said auxiliary module comprises at least an auxiliary wheel pressing said material tape against said insulating part of said electrode wheel.

14. The continuous electrochemical machining apparatus of claim 2, wherein said electrode body includes an electrolyte channel; said electrolyte channel comprises a first opening and a second opening; said first opening is located at the central part of a sidewall of said electrode wheel; and said second opening is located in the region of said conductive pattern.

15. The continuous electrochemical machining apparatus of claim 2, wherein said electrode body includes an electrolyte channel; said electrolyte channel comprises a first opening and a plurality of second openings; said first opening is located at the central part of a sidewall of said electrode wheel; and said plurality of second openings are located at the bottom part of said recess of said insulating part and in the region of said conductive pattern.

* * * * *